(12) United States Patent
Maeda et al.

(10) Patent No.: US 7,110,642 B2
(45) Date of Patent: Sep. 19, 2006

(54) LIGHTING DEVICE AND LIQUID CRYSTAL DISPLAY DEVICE

(75) Inventors: Satoshi Maeda, Kawasaki (JP); Hirokazu Aritake, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/214,887

(22) Filed: Aug. 31, 2005

(65) Prior Publication Data

US 2006/0115213 A1 Jun. 1, 2006

Related U.S. Application Data

(63) Continuation-in-part of application No. 11/061,453, filed on Feb. 22, 2005, now abandoned.

(30) Foreign Application Priority Data

Nov. 30, 2004 (JP) .............. 2004-346954
May 6, 2005 (JP) .............. 2005-135073

(51) Int. Cl.
G02B 6/26 (2006.01)

(52) U.S. Cl. .......... 385/31; 385/15
(58) Field of Classification Search ........ 385/31, 385/147
See application file for complete search history.

(56) References Cited

U.S. PATENT DOCUMENTS 5,101,458 A * 3/1992 Spaulding et al. ......... 385/36

| | | | |
|---|---|---|---|
| 5,791,757 A | 8/1998 | O'Neil et al. | |
| 5,833,517 A | 11/1998 | Konda et al. | |
| 6,600,845 B1* | 7/2003 | Feldman et al. | ...... 385/14 |
| 6,648,485 B1 | 11/2003 | Colgan et al. | |
| 2002/0048162 A1 | 4/2002 | Ohkawa et al. | |
| 2003/0170442 A1 | 9/2003 | Kaminsky et al. | |
| 2003/0235047 A1 | 12/2003 | Choi et al. | |
| 2004/0212978 A1 | 10/2004 | Yu et al. | |

FOREIGN PATENT DOCUMENTS

| EP | 1348987 A2 | 10/2003 |
|---|---|---|
| JP | 08095042 | 4/1996 |
| JP | 2002-357823 | 12/2002 |
| JP | 2003-57652 | 2/2003 |
| JP | 2003-331628 | 11/2003 |
| JP | 2004-163886 | 6/2004 |

OTHER PUBLICATIONS

European Search Report dated Mar. 30, 2006.
Yoshihiko Hirai, et al., "Imprint Lithography for Curved Cross-Sectional Structure Using Replicated Ni Mold", Journal of Vacuum Science and Technology, B29(6), Nov./Dec. 2002, American Vacuum Society, pp. 2867-2871.European Search Report dated Mar. 30, 2006.

* cited by examiner

*Primary Examiner*—Jennifer Doan
(74) *Attorney, Agent, or Firm*—Westerman, Hattori, Daniels & Adrian, LLP.

(57) ABSTRACT

A backlight (lighting device) is arranged on a backside of a liquid crystal panel, and comprises an LED, an optical waveguide, a reflective sheet, and a prism sheet. A diffractive optical element (DOE) constituted of a binary concave and convex pattern is formed in an end surface of the optical waveguide on an LED arranged side.

23 Claims, 22 Drawing Sheets

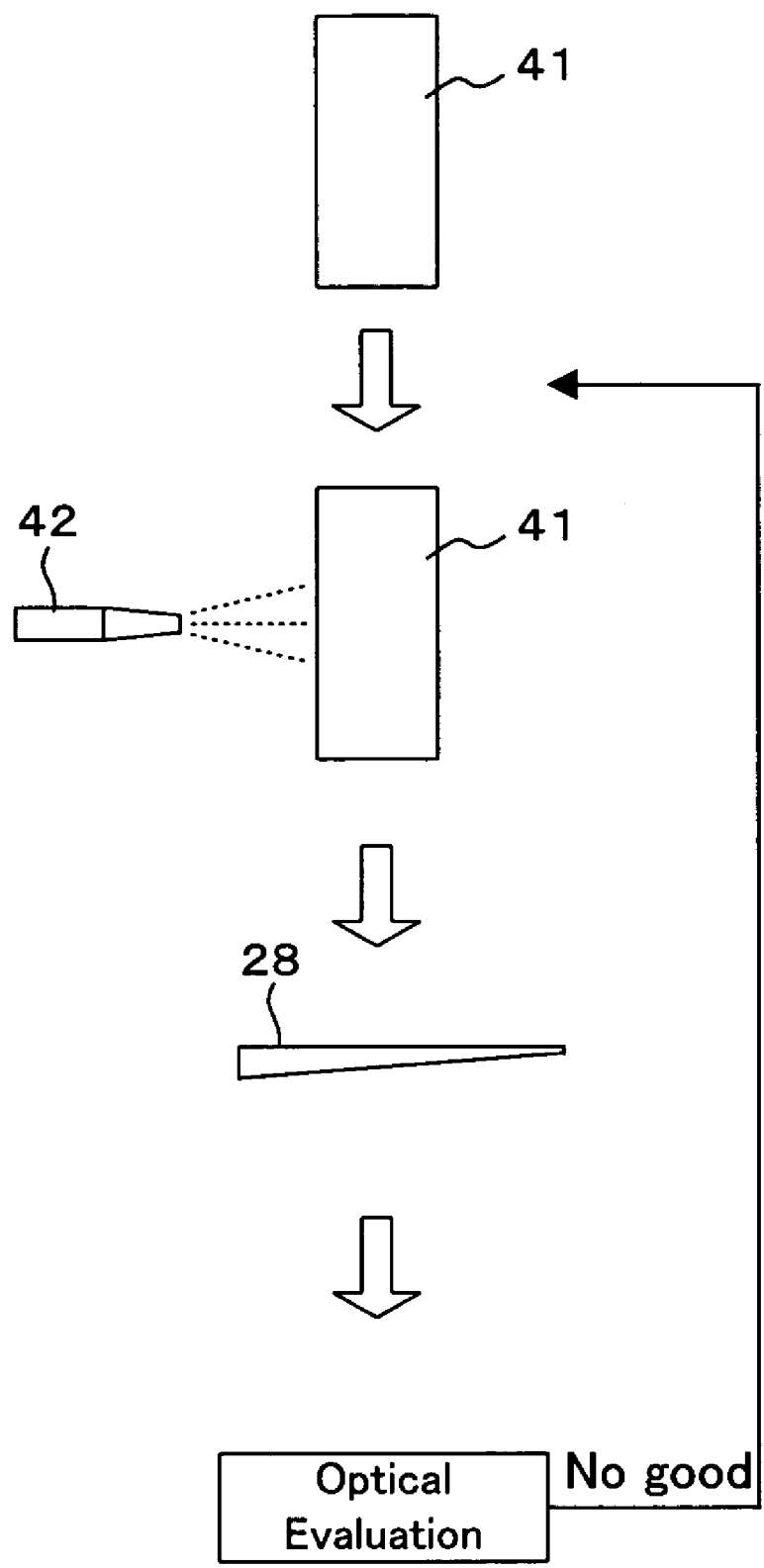

LIGHTING DEVICE AND LIQUID CRYSTAL DISPLAY DEVICE

CROSS-REFERENCE TO RELATED APPLICATION

This application is a Continuation in Part of U.S. application Ser. No. 11/061,453, filed on Feb. 22, 2005, now abandoned. This application is based on and claims priority of Japanese Patent Application No. 2004-346954 filed on Nov. 30, 2004 and Japanese Patent Application No. 2005-135073 filed on May 6, 2005, the entire contents of which are incorporated herein by reference.

BACKGROUND OF THE INVENTION

1. Field of the Invention

The present invention relates to a lighting device comprising a light source and an optical waveguide, and a liquid crystal display device using the same.

2. Description of the Prior Art

Liquid crystal display devices have widely been used for electronic devices such as portable telephones, personal digital assistants (PDA) and the like because of thin formation, light weight, and small power consumption. Lighting devices called backlights are usually disposed in the liquid crystal display devices used for such electronic devices.

FIG. 1 is a schematic diagram showing an example of a conventional liquid crystal display device. As shown in FIG. 1, the liquid crystal display device comprises a liquid crystal panel 10, and a backlight 20 arranged on a backside of the liquid crystal panel 10.

The liquid crystal panel 10 is formed by sealing a liquid crystal 12 between two transparent substrates 11a and 11b. Polarizing plates (not shown) are arranged on both sides of the liquid crystal panel 10 in a thickness direction thereof.

The backlight 20 comprises a light emitting diode (LED) 21 which becomes a light source, an optical waveguide 22, a reflective sheet 23, and a prism sheet 24. The LED 21 is arranged on one end surface side of the optical waveguide 22. In the case of a 2-inch liquid crystal panel, three to four LED's 21 are usually used.

The optical waveguide 22 is made of a transparent resin, and wedge-shaped in section as shown in FIG. 1. The reflective sheet 23 is arranged on a backside of the optical waveguide 22, and the prism sheet 24 is arranged on a front side (liquid crystal panel 10 side).

In the liquid crystal display device configured in such a manner, light emitted from the LED 21 enters the optical waveguide 22, is reflected by the reflective sheet 23, and emitted toward the liquid crystal panel 10.

A pixel electrode is formed for each pixel in one of the two transparent substrates 11a and 11b constituting the liquid crystal panel 10, and a common electrode is formed in the other substrate to face the pixel electrode. An amount of light transmitted through the pixels can be controlled by voltage applied between the pixel electrode and the common electrode. A desired image can be then displayed by controlling a light transmission amount for each pixel.

In the liquid crystal display device, light emitted from the backlight 20 preferably uniformly illuminates an entire surface of the liquid crystal panel 10. Accordingly, the fine concave and convex portions are formed on the front side or the backside of the optical waveguide 22 to scatter the light more uniformly, or the prism sheet 24 is arranged as a light distribution control plate between the optical waveguide 22 and the liquid crystal panel 10 as shown in FIG. 1.

However, if only the LED 21 is arranged near the end surface of the optical waveguide 22 as shown in FIG. 1, uneven brightness occurs to cause a problem of reduction in quality of an image displayed in the liquid crystal display device. FIG. 2 is a plan view when the backlight 20 is seen from the liquid crystal panel 10 side. As shown in FIG. 2, a plurality of LED's 21 are usually used for the liquid crystal display device. However, if only the LED's 21 are arranged near the end surface of the optical waveguide 22, light does not reach a region between adjacent LED's 21, creating dark portions (portions indicated by A in FIG. 2), and portions of high luminance (portions indicated by B in FIG. 2) are created near the front of the LED's 21.

Various technologies have conventionally been developed to solve the aforementioned problems. For example, in Patent Document 1, Japanese Patent Laid-Open No. 2004-163886 discloses a lighting device in which concave lenses are arranged between an optical waveguide and each of light sources. In this lighting device, the light emitted from the light sources is refracted by the concave lenses. Thus, occurrence of uneven brightness can be avoided. Moreover, in Patent Document 2, Japanese Patent Laid-Open No. 2002-357823, as shown in FIG. 3A, an optical waveguide 26 having a semicircular notch formed in a portion corresponding to an LED 21 is described. In this optical waveguide 26, light emitted from the LED 21 is refracted by the notch. Thus, the light reaches a region between adjacent LED's 21 to prevent uneven brightness.

Further, in Patent Document 3, Japanese Patent Laid-Open No. 2003-331628, as shown in FIG. 3B, formation of many prisms (triangular concave and convex portions) 27a in an entire end surface of an LED arranged side of an optical waveguide 27 is described. In this optical waveguide 27, light emitted from an LED 21 is refracted by the prism 27a. Thus, the light reaches a region between adjacent LED's 21 to suppress uneven brightness.

Furthermore, as shown in FIG. 3C, there is an optical waveguide 28 having fine concave and convex portions formed in an end surface of its LED arranged side. Such fine concave and convex portions are formed by blast processing with a mold block. In the optical waveguide 28, light emitted from an LED 21 is scattered by the fine concave and convex portions when it enters the optical waveguide, and reaches a region between adjacent LED's 21 to prevent uneven brightness.

FIG. 4 is a schematic diagram showing a method of manufacturing the optical waveguide 28 shown in FIG. 3C. As shown in FIG. 4, the mold block 41 is subjected to a blast processing. To be more specific, concave and convex portions are formed on a surface by spraying sands (abrasive grains) injected through a nozzle 42 to a mold block 41. At this time, concave and convex patterns can be changed by adjusting a material, a particle diameter, an injecting speed, an injecting amount, an injecting angle or the like of sand. Next, the optical waveguide 28 is molded by using the mold block 41. Subsequently, an LED, a reflective sheet, a prism sheet and the like are mounted to the optical waveguide 28 to constitute a backlight, and optical characteristic (uniformity) is evaluated by lighting the LED. Then, if desired optical characteristic is not obtained, blast processing is performed again by changing conditions.

However, the conventional lighting devices using the optical waveguides shown in FIGS. 3A to 3C have the following problems. That is, in the lighting device using the optical waveguide 26 shown in FIG. 3A, the LED 21 and the semicircular notch must be fairly accurately aligned with each other. The device lacks versatility because the number and positions of LED's 21 are determined by the notch of the optical waveguide 26. Thus, it is not easy to deal with changes in panel size.

In the lighting device using the optical waveguide 27 shown in FIG. 3B, the LED 21 and the prism 27a must be fairly accurately aligned with each other. A certain distance is necessary between the LED 21 and the optical waveguide 27 to effectively use the prism 27a. Thus, leakage light not entering the optical waveguide 27 increases to reduce light usage efficiency, causing a problem of reduction in an amount of light emitted to the liquid crystal panel side.

In the optical waveguide 28 shown in FIG. 3C, fairly accurate alignment is not necessary because of the formation of the fine concave and convex portions in the entire end surface on the LED arranged side. However, the concave and convex portions exhibiting desired characteristics must be formed by repeating the blast processing for the mold block 41, the molding and the optical evaluation. Thus, there is a drawback that the mold manufacturing takes time. In the case of a portable telephone, many molds are necessary because there are many manufacturing steps. However, reproducibility of concave and convex portions by the blast processing is low, causing a problem of nonuniform mold qualities, which in turn causes an increase in manufacturing cost.

Moreover, even the lighting device disclosed in Japanese Patent Laid-Open No. 2004-163886 involves a complicated procedure in which the light sources are aligned with the lenses with high precision. In addition, a large space needs to be secured between the optical waveguide and each of the light sources, leading to a decrease of light usage efficiency.

SUMMARY OF THE INVENTION

Therefore, objects of the present invention are to provide a lighting device having no uneven brightness, high light usage efficiency, and high reproducibility of optical characteristic and capable of reducing manufacturing costs, and a liquid crystal display device using the lighting device.

The objects are achieved by a lighting device which comprises a light source, an optical waveguide for inputting light emitted from the light source from an end surface to the inside and outputting the light in a predetermined direction, and a diffractive optical element arranged in the end surface of the optical waveguide on the light source side.

In the lighting device of the present invention, the light emitted from the light source is diffracted or diffused by using diffractive optical elements (DOE) to prevent uneven brightness. Each diffractive optical element is constituted of binary concave and convex pattern formed on the end surface of the optical waveguide, for example, i.e. concave and convex pattern uniform in concave depth and convex height. Such concave and convex pattern can be relatively easily formed by using, e.g. a photoresist method, and reproducibility is high. Thus, it is possible to maintain uniform quality of the lighting device. Additionally, since a space between the light source and the DOE can be narrowed, a leakage light is limited and light usage efficiency is high.

Furthermore, for example, the concave and convex pattern of the DOE is determined based on optimization by a Gerchberg-Saxton algorithm or a simulated annealing algorithm to exhibit desired diffusion characteristics or diffraction characteristics. Thus, it is not necessary to perform optical evaluation during mold manufacturing. As a result, the mold manufacturing becomes easy, and manufacturing costs of the lighting device can be reduced.

In order to obtain desired optical characteristics, the angle which the boundary surfaces between the concave and convex portions of the concave and convex pattern of the DOE (i.e. the sidewall surfaces of the concave and convex portions) form with the light sources-side end surface of the optical waveguide is preferably 90°. However, similar DOE characteristics can be obtained if the angle which the boundary surfaces between the concave and convex portions form with the light sources-side end surface of the optical waveguide is 30° or above. Further, by inclining the boundary surfaces between the concave and convex portions in this way, manufacturing of the DOEs can be facilitated. Similarly, a degradation in the DOE characteristics is small if the edges of the concave and convex portions are rendered rounded. Thus, manufacturing of DOEs can be facilitated.

By using the lighting device in which a DOE is formed on the light source-side end surface of the optical waveguide in this way, display quality of the liquid crystal display device can be improved.

Note that, Japanese Patent Laid-Open No. 2003-57652 discloses a lighting device in which a diffraction grating is provided on the surface of an optical waveguide facing the liquid crystal panel. However, elements by which light is refracted or diffracted are not provided between the optical waveguide and each of light sources in this lighting device. For this reason, brightness may be reduced at the place between the light sources in the vicinity of the end surface of the optical waveguide.

BRIEF DESCRIPTION OF THE DRAWINGS

FIG. 4 is a schematic diagram showing a method of manufacturing an optical waveguide of the backlight shown in FIG. 3C;

DESCRIPTION OF THE PREFERRED EMBODIMENTS

Next, the present invention will be described with reference to the accompanying drawings.

First Embodiment

Figure 1:
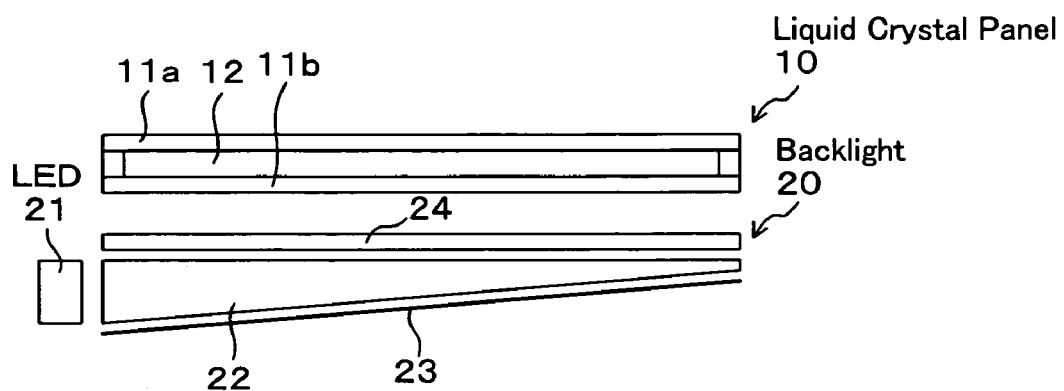
FIG. 1 is a schematic diagram showing an example of a conventional liquid crystal display device.
Figure 2:
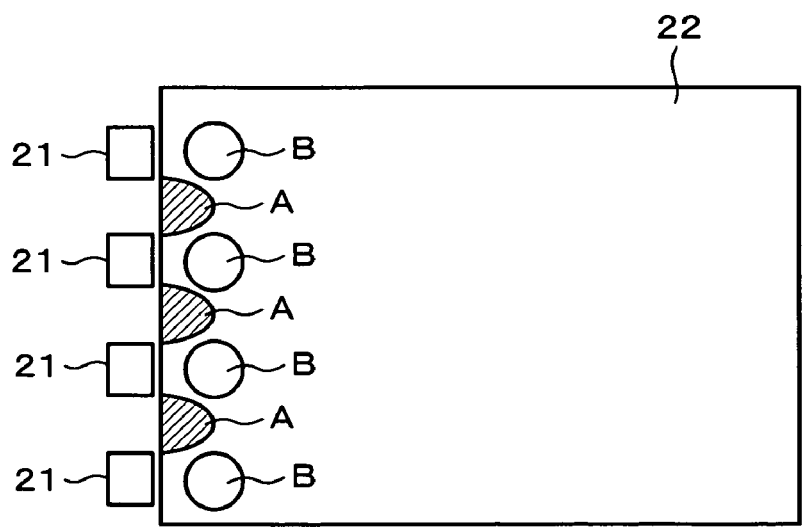
FIG. 2 is a plan view when a conventional lighting device (backlight) is seen from a liquid crystal panel side.
Figure 3A:
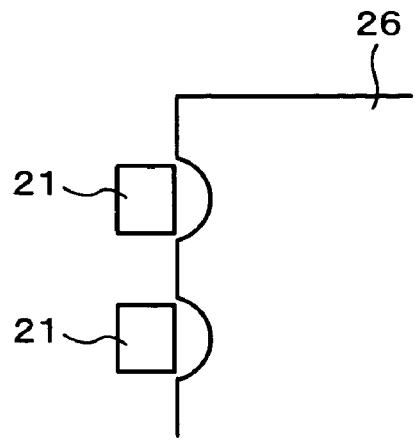
FIGS. 3A, 3B and 3C are schematic diagrams showing examples of conventional backlights.
Figure 3B:
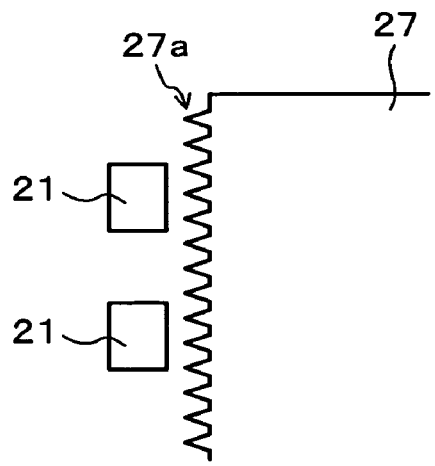
Figure 3C:
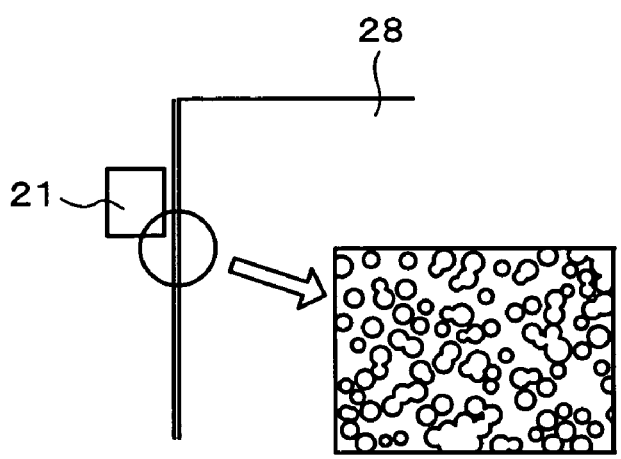
Figure 5:
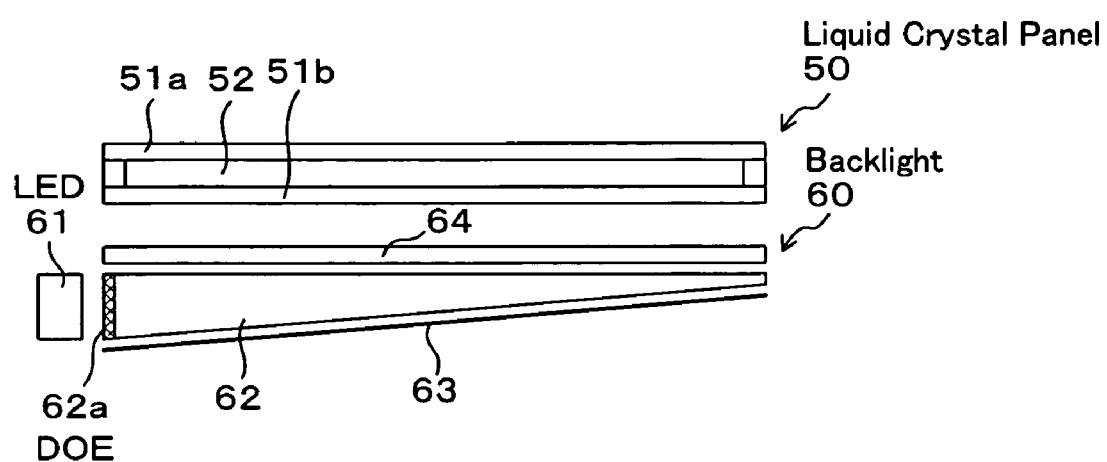
FIG. 5 is a schematic diagram showing a liquid crystal display device using a lighting device according to a first embodiment of the present invention.

FIG. 5 is a schematic diagram showing a liquid crystal display device which uses a lighting device according to a first embodiment of the present invention. As shown in FIG. 5, the liquid crystal display device comprises a liquid crystal panel 50, and a backlight 60 arranged on a backside of the liquid crystal panel 50.

The liquid crystal panel 50 is formed by sealing a liquid crystal 52 between two transparent substrates 51a and 51b. Polarizing plates (not shown) are arranged on both sides of the liquid crystal panel 50 in a thickness direction thereof. The size of the liquid crystal panel 50 is, for example, 2 to 4 inches.

The backlight 60 comprises a plurality of LED's 61 as light sources, an optical waveguide 62, a reflective sheet 63, and a prism sheet 64. The LED's 61 are arranged along one end surface of the optical waveguide 62.

The optical waveguide 62 is made of a transparent resin of polymethyl methacrylate (PMMA) or the like, and wedge-shaped in section as shown in FIG. 5. The size of the optical waveguide 62 is substantially equal to that of the liquid crystal panel 50, and the thickness in an end on an LED arranged side is about 1 mm. The reflective sheet 63 is arranged on a backside of the optical waveguide 62, and the prism sheet 64 is arranged as a light distribution control plate on a front side (liquid crystal panel 50 side). A diffractive optical element (DOE) 62a constituted of binary concave and convex pattern distributed in two-dimensional directions is formed in an end surface of the optical waveguide 62 on the LED arranged side. By this DOE 62a, light emitted from the LED 61 is diffused or diffracted when it enters the optical waveguide 62 to prevent uneven brightness.

Figure 6A:
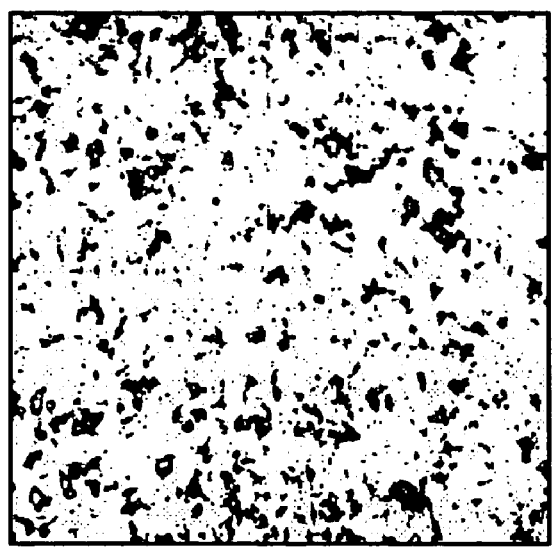
FIG. 6A is a plan view showing a DOE of the lighting device of the first embodiment.
Figure 6B:
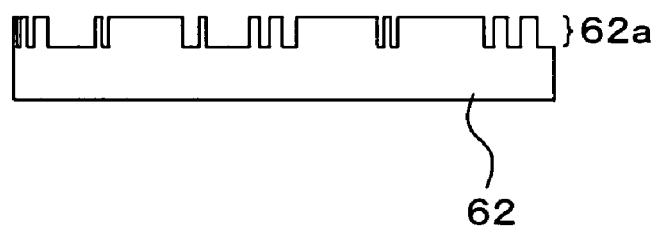
FIG. 6B is a schematic diagram showing the DOE in section.

FIG. 6A is a plan view showing the DOE 62a, and FIG. 6B is a schematic diagram showing a cross section of the same. In FIG. 6A, a white portion is a convex portion, and a black portion is a concave portion. The depth of the concave portion is, for example, 0.4 to 0.7 μm.

Figure 7A:
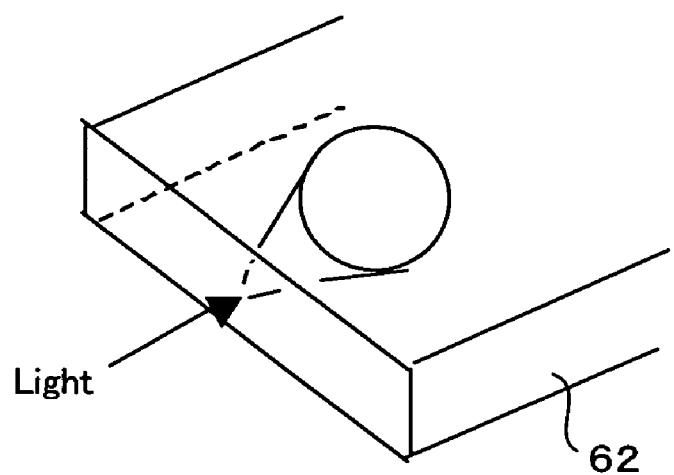
FIG. 7A is a schematic diagram showing diffusion characteristics of the DOE of the first embodiment.
Figure 7B:
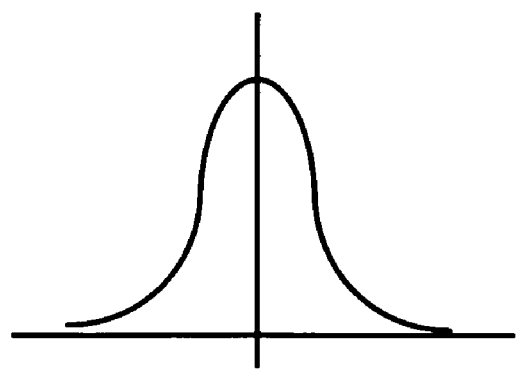
FIG. 7B is a diagram showing a Gaussian distribution.
Figure 8A:
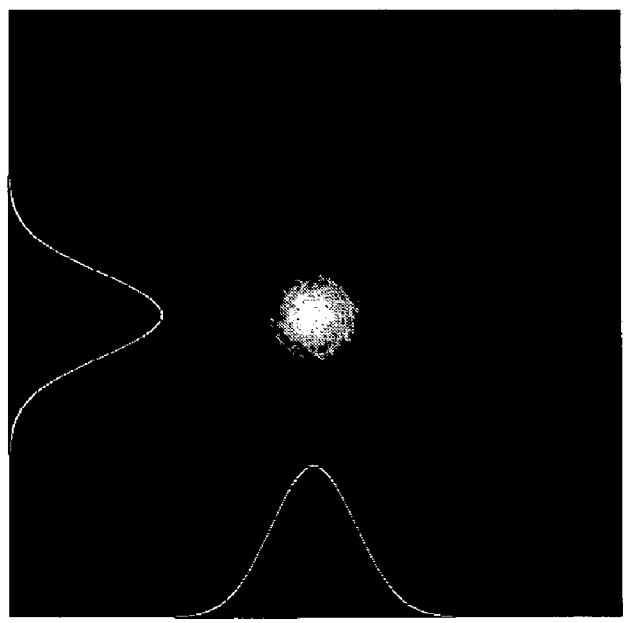
FIG. 8A shows diffusion characteristics of the Gaussian distribution targeted by the first embodiment.
Figure 8B:
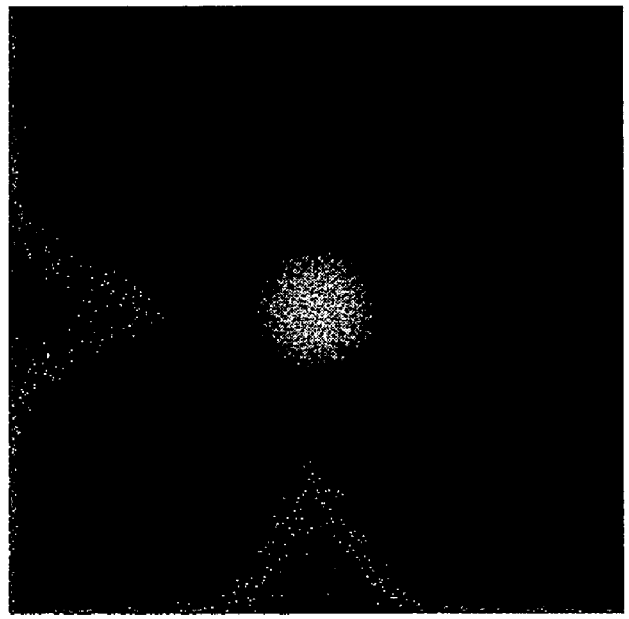
FIG. 8B shows diffusion characteristics of the DOE having optimized concave and convex pattern.
Figure 9:
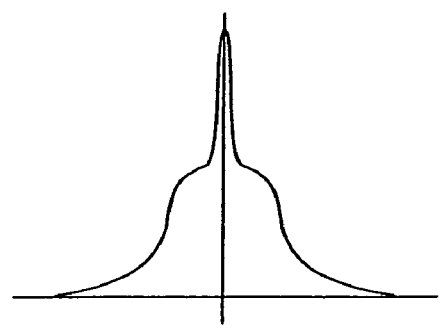
FIG. 9 is a diagram showing an example of a combination of a plurality of Gaussian distributions (two Gaussian distributions)

The concave and convex pattern of the DOE 62a is obtained by optimizing concave and convex pattern to exhibit desired diffusion characteristics or diffraction characteristics by an existing Gerchberg-Saxton algorithm or simulated annealing algorithm. According to this embodiment, as shown in FIGS. 7A and 7B, the concave and convex pattern is optimized so that diffusion characteristics of the DOE 62a can show Gaussian distributions in both of surfaces parallel to and perpendicular to the surface of the optical waveguide 62 on the LED arranged side. FIG. 8A shows diffusion characteristics of a Gaussian distribution targeted by the embodiment, and FIG. 8B shows diffusion characteristics of the DOE having the optimized concave and convex pattern. As shown in FIG. 9, a plurality of Gaussian distributions (two Gaussian distributions in FIG. 9) may be combined to obtain target diffusion characteristics.

Figure 10:
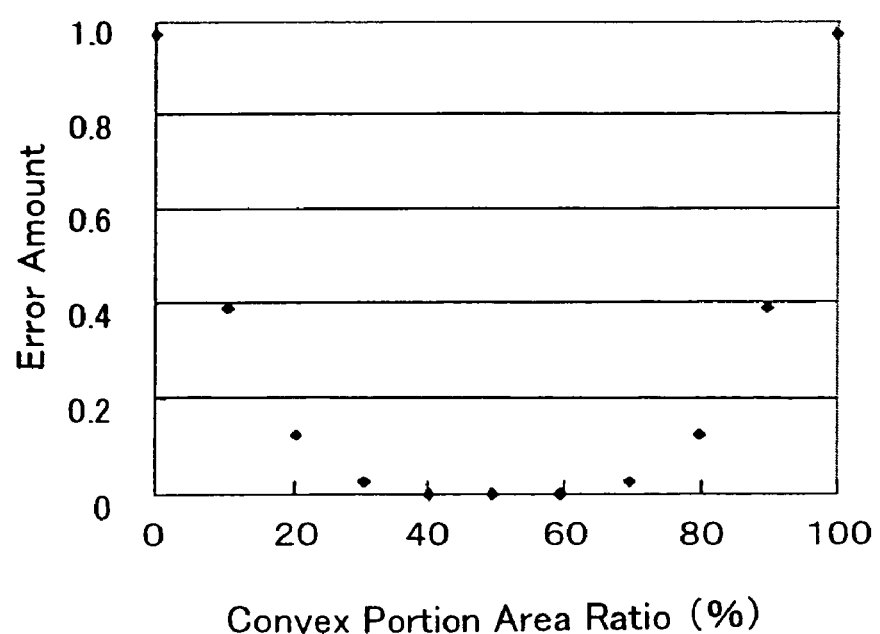
FIG. 10 is a diagram showing a relation of error amount with respect to an area ratio of a convex portion to the entire area of the DOE.

FIG. 10 shows a relation between an area ratio of the convex portion to a total area (sum-total of areas of the convex and concave portions) of the DOE 62a indicated by the abscissa and an error amount (ratio of a difference between target diffusion characteristics and diffusion characteristics of the DOE) indicated by the ordinate. As obvious from FIG. 10, the error amount can be reduced by setting the area ratio of the convex portion in the range of 30 to 70%, enabling diffusion characteristics to be obtained substantially as designed. Moreover, the error amount can be ignored by setting the area ratio of the convex portion in the range of 40 to 60%. In other words, by setting the area ratio of the convex portion in the range of 40 to 60%, the error amount becomes $10^{-3}$ or lower when a value of integrating a diffusion profile is 1.

FIGS. 11A to 11E are schematic diagrams showing a method of manufacturing a mold used for manufacturing the DOE 62a.

First, a reticle (exposure mask) plotting optimized concave and convex pattern is prepared.

Figure 11A:
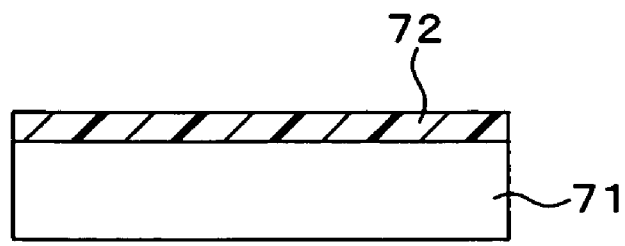
FIGS. 11A, 11B, 11C, 11D and 11E are schematic diagrams showing a method of manufacturing a mold used for DOE manufacturing.
Figure 11B:
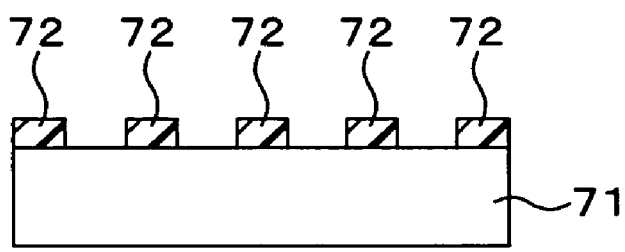

Next, as shown in FIG. 11A, a photoresist is coated on a silicon substrate 71 to form a photoresist film 72. Then, stepper exposure (reduction exposure) is performed by using the prepared reticle. Development is subsequently carried out to transfer the concave and convex pattern of the reticle to the resist film 72 as shown in FIG. 11B.

Figure 11C:
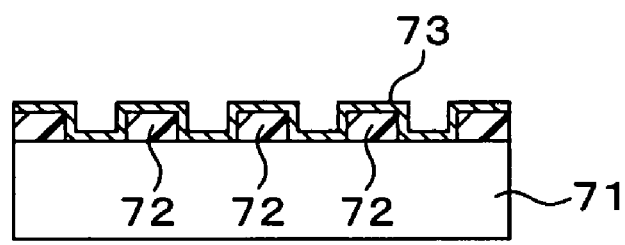
Figure 11D:
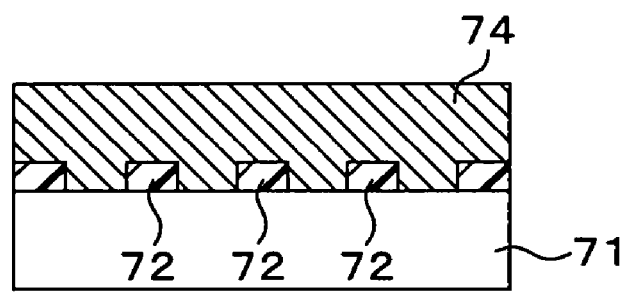

Next, as shown in FIG. 11C, nickel (Ni) is sputtered on an entire upper surface of the silicon substrate 71 to form a substrate film 73. Subsequently, as shown in FIG. 11D, the substrate film 73 is electrolytically plated with Ni till a sufficient thickness is achieved to form a metal block 74.

Figure 11E:
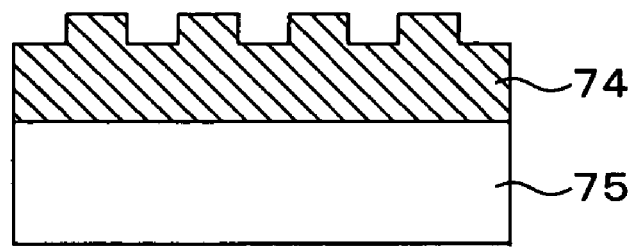

Next, as shown in FIG. 11E, the metal block 74 is removed from the silicon substrate 71, processed into a predetermined outer shape, and then joined with a reinforcing plate 75 to constitute a mold. However, when the metal block 74 has sufficient strength, the metal block 74 may be formed as a mold without joining it with the reinforcing plate 75.

The mold having concave and convex pattern thus formed is combined with the other mold. Then, a transparent resin of PMMA or the like is injected into a space formed by the molds to form the optical waveguide 62 having the DOE 62a.

The example in which the metal block 74 removed from the silicon substrate 71 is used as the mold has been described above. However, the metal block 74 may be used as a stamper, and the stamper may be electrolytically plated with Ni to form a mold. Thus, molds of the same quality can be manufactured in large numbers. When a mold is formed by using the metal block 74 as stamper, convex and concave portions are reversed compared with the case where the metal block 74 is formed into the mold. However, the DOE 62a is constituted of the binary concave and convex pattern according to the embodiment. Thus, the reversal of the convex and concave portions causes no changes in optical characteristics of the DOE 62a.

As described above, according to this embodiment, since the light emitted from the LED 61 is diffused by the DOE's 62a constituted of the binary concave and convex pattern, uneven brightness in the optical waveguide 62 is prevented, and the entire liquid crystal panel 50 is uniformly irradiated with the light. Thus, the embodiment provides an effect that a good quality image can be displayed in the liquid crystal display device.

Furthermore, according to the embodiment, the concave and convex pattern of the mold for forming the DOE are formed by the photoresist method and the plating method. Accordingly, mold manufacturing is easier compared with the conventional method of forming the concave and convex pattern by the blast processing, and uniform and high quality lighting device can be mass-produced. Thus, the embodiment provides an effect that manufacturing costs of the lighting device for the liquid crystal display device can be reduced.

Figure 12:
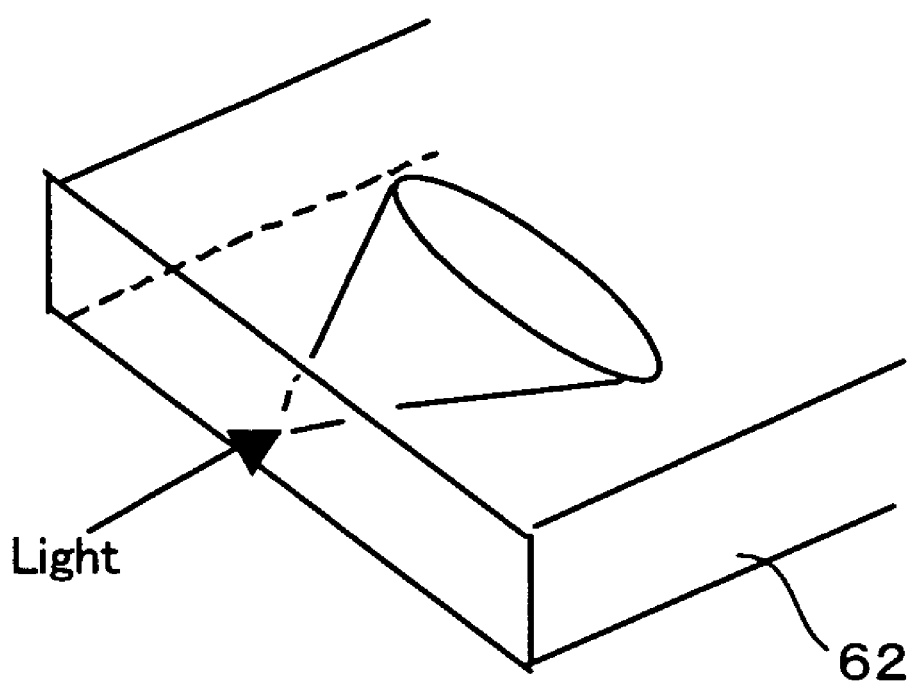
FIG. 12 is a schematic diagram showing an oval diffusion distribution in which a thickness direction of an optical waveguide is a short axis and a width direction is a long axis.
Figure 13:
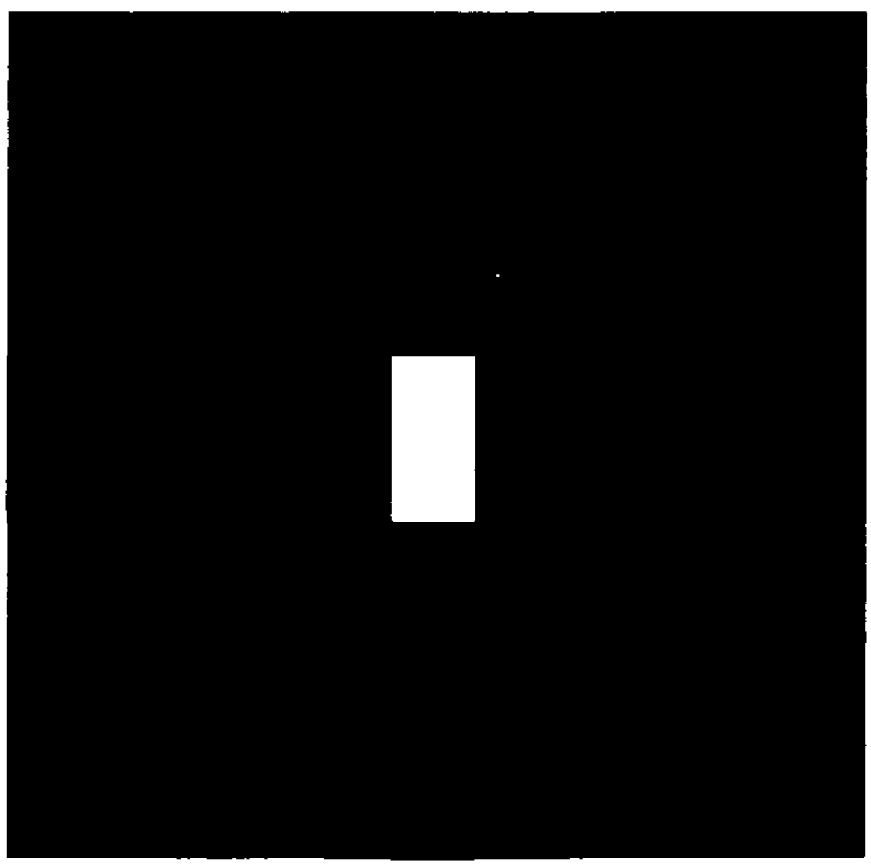
FIG. 13 is a diagram showing target diffusion characteristics when a diffusion distribution is rectangular.

The embodiment has been described by way of the case where the DOE 62a exhibits point symmetrical diffusion characteristics, i.e. a diffusion intensity distribution becomes circular in the surface parallel to the end surface of the optical waveguide 62 on the LED arranged side. However, the DOE 62a is not limited to that which exhibits the point-symmetrical diffusion characteristics, but it may exhibit diffusion characteristics having anisotropy. For example, as shown in FIG. 12, the concave and convex pattern of the DOE 62a may be optimized to form a diffusion distribution of an ellipse shape in which a thickness direction of the optical waveguide 62 is a short axis and a width direction is a long axis. Alternatively, the concave and convex pattern of the DOE 62a may be optimized to form a diffusion distribution of a rectangular shape in which a thickness direction of the optical waveguide 62 is a short side and a width direction is a long side. When the diffusion distribution of the DOE 62a is set in such a manner, there is an advantage of further reducing the danger of leakage light compared with the case of the circular diffusion distribution, thereby further increasing light usage efficiency. FIG. 13 shows target diffusion characteristics when the diffusion distribution is rectangular.

Figure 14A:
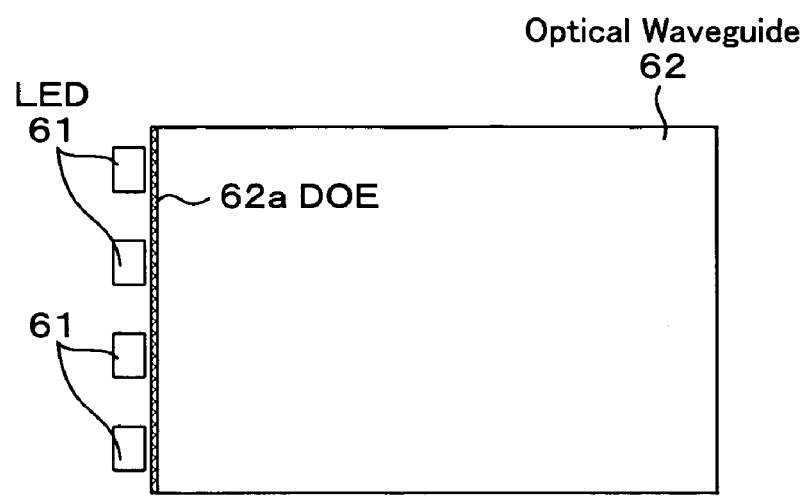
FIG. 14A is a schematic diagram showing an example in which a DOE is formed on the entire end surface of the optical waveguide on an LED arranged side.
Figure 14B:
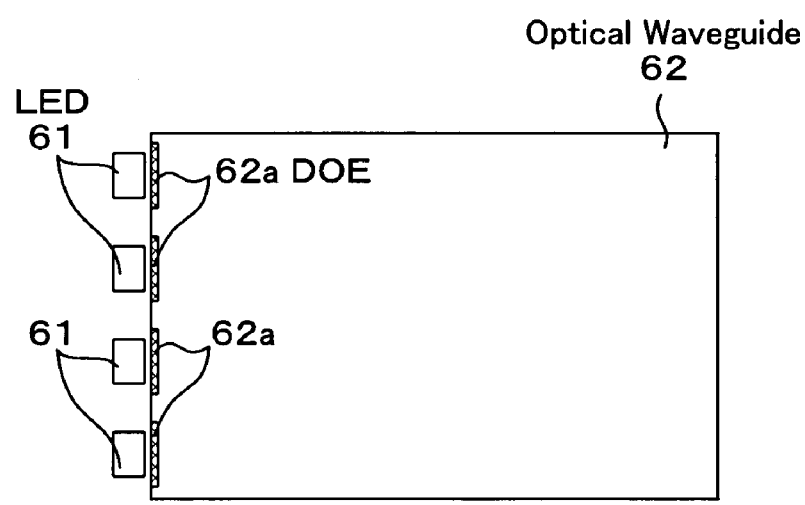
FIG. 14B is a schematic diagram showing an example in which a DOE is formed only in a portion near an LED.

The embodiment has been described by way of the case where the DOE 62a is formed in the entire end surface of the optical waveguide 62 on the LED arranged side as shown in FIG. 14A. However, as shown in FIG. 14B, the DOE 62a may be formed only in a portion near the LED 61. When the DOE 62 is formed as shown in FIG. 14A, it is not necessary to perform fairly accurate alignment between the LED 61 and the optical waveguide 62. Thus, there are advantages that assembling can be facilitated and changes in panel size or the like can be easily dealt with. Moreover, when the DOE 62a is formed as shown in FIG. 14B, there is an advantage that time necessary for stepper exposure during the mold manufacturing can be shortened.

Second Embodiment

The first embodiment has been described by way of example in which the concave and convex pattern is optimized by the Gerchberg-Saxton algorithm or the simulated annealing algorithm to design the concave and convex pattern of the DOE. However, binary concave and convex pattern of the DOE may be designed from data of current concave and convex pattern of a mold (mold manufactured by a method shown in FIG. 4). This method will be described below.

Figure 15A:
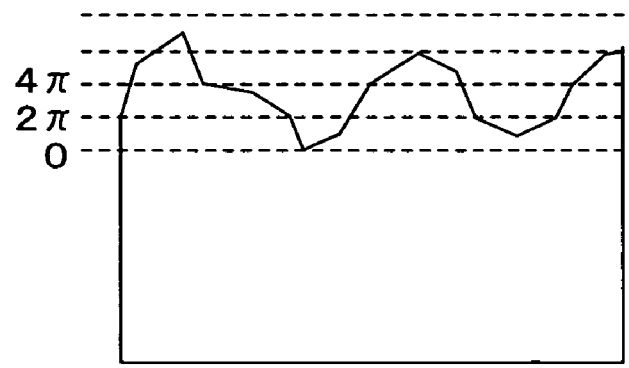
FIGS. 15A, 15B and 15C are schematic diagrams showing a method of designing a binary concave and convex pattern of DOE according to a second embodiment.
Figure 15B:
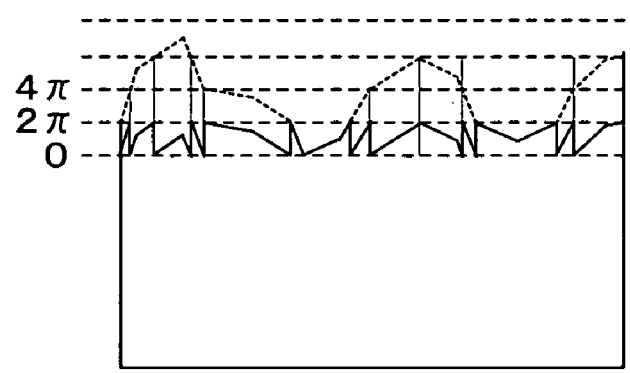
Figure 15C:
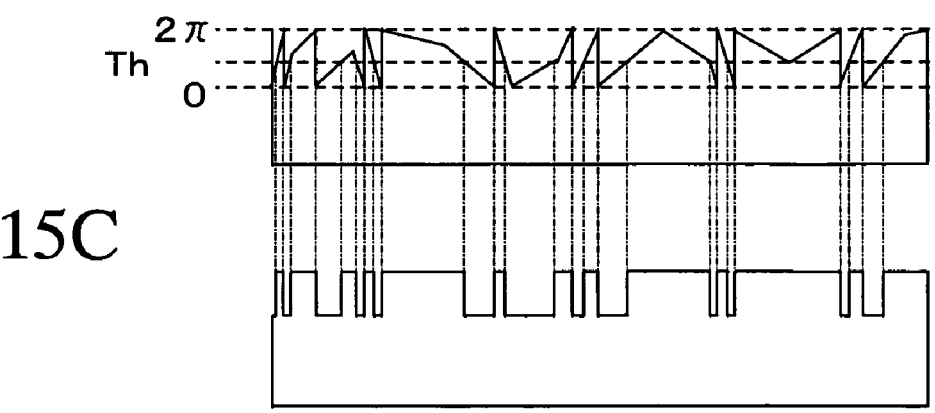

FIGS. 15A to 15C are schematic diagrams showing the method of designing binary concave and convex pattern from the current concave and convex pattern of the mold.

First, the current concave and convex pattern of the mold is measured by a three-dimensional shape measuring device. FIG. 15A shows concave and convex pattern of a mold in which concave and convex pattern is formed by blast processing. Next, from the measuring result of the three-dimensional shape measuring device, data is created in which a height h at each point of the concave and convex surfaces is a function (h=f(X, Y)) of a position (X, Y). A phase change component of the concave and convex pattern is extracted from this data.

That is, first, as shown in FIG. 15B, portions, from a lowest portion of the concave portion to a highest portion of the convex portion, are divided into a plurality of regions (0 to $2\pi$, $2\pi$ to $4\pi$, ...) for each given cycle ($2\pi$) in accordance with a wavelength (design wavelength) of light to be used. Then, a height change in each region is extracted to be converted into a change in the range of 0 to $2\pi$.

Next, as shown in FIG. 15C, a threshold value Th is set. Then, a region lower than the threshold value Th is set as a concave portion, a region higher than the threshold value Th is set as a convex portion, and binary concave and convex pattern is determined. The threshold value Th may be set optionally in the range of 0 to $2\pi$. However, an area ratio of the convex portion is preferably set in the range of 40 to 60% to reduce an error amount of diffusion characteristics.

After the binary concave and convex pattern has been determined in the aforementioned manner, a reticle plotting the concave and convex pattern is prepared as in the case of the first embodiment, and a mold used for forming a DOE is manufactured by using a photoresist method and a plating method. Subsequently, an optical waveguide having a DOE in an end surface is manufactured by using the mold, an LED is mounted near the end surface of the optical waveguide, and a reflective sheet and a prism sheet are arranged when necessary, thereby completing a lighting device. A liquid crystal display device is completed by mounting the lighting device to a liquid crystal panel.

As in the case of the first embodiment, the second embodiment provides an effect that uneven brightness in the optical waveguide can be prevented and a good quality image can be displayed in the liquid crystal display device. Moreover, according to this embodiment, mold manufacturing is also easy, and uniform and high quality lighting devices can be mass produced.

Third Embodiment

Figure 16A:
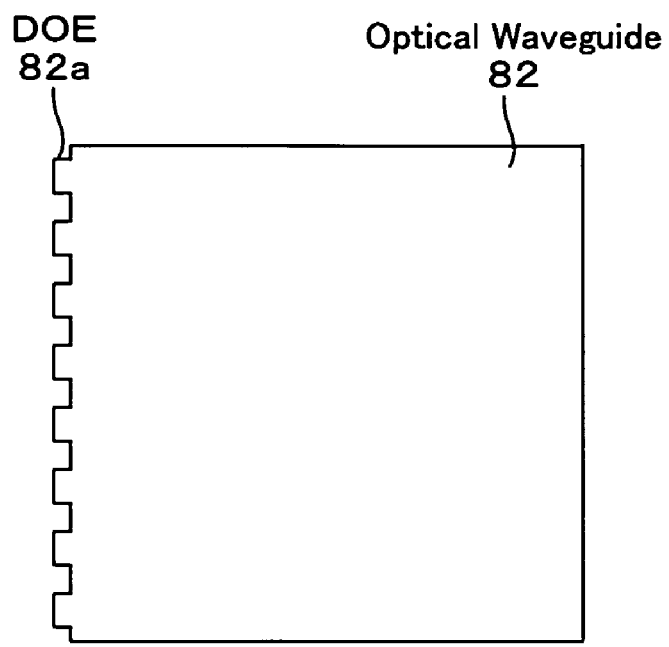
FIG. 16A is a plan view showing an optical waveguide of a lighting device for a liquid crystal display device according to a third embodiment of the present invention.
Figure 16B:
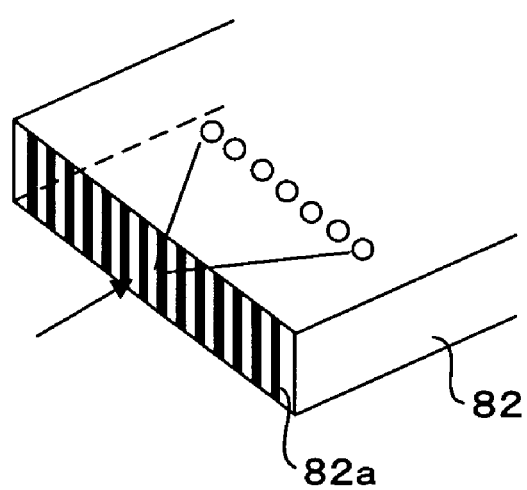
FIG. 16B is a perspective view showing a DOE disposed in an end surface of the optical waveguide.

FIG. 16A is a plan view showing an optical waveguide of a lighting device for a liquid crystal display device according to a third embodiment of the present invention. FIG. 16B is a perspective view showing a DOE disposed in an end surface of the optical waveguide. The embodiment is different from the first embodiment in a DOE structure. Other components are basically similar to those of the first embodiment, and thus description of similar portions will be omitted.

According to the embodiment, a DOE 82a for generating a high-order diffracted light is formed in an end surface of an optical waveguide 82. The high-order diffracted light generating DOE 82a is constituted of one-dimensional diffraction grating concave and convex pattern to provide anisotropy to the diffracted light. The one-dimensional diffraction grating concave and convex pattern is determined by optimizing a concave and convex pattern by, e.g. a Rigorous Coupled-Wave Analysis method.

Figure 17A:
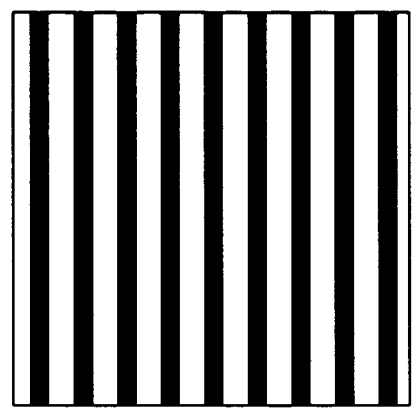
FIG. 17A is a plan view showing concave and convex pattern of a one-dimensional diffraction grating type DOE.
Figure 17B:
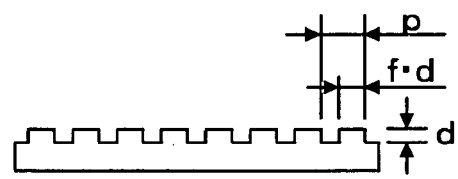
FIG. 17B is a schematic sectional diagram showing the one-dimensional diffraction grating type DOE.

FIG. 17A is a plan view showing concave and convex patterns of the one-dimensional diffraction grating type DOE, and FIG. 17B is a schematic sectional diagram showing the one-dimensional diffraction grating type DOE. In FIG. 17A, a black portion is a concave portion, and a white portion is a convex portion.

Figure 18:
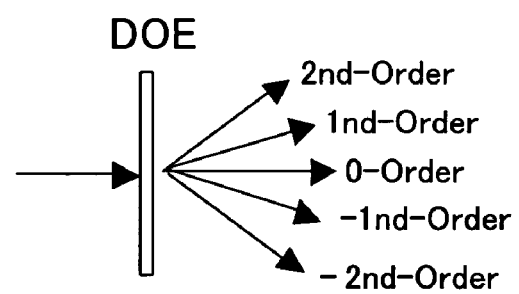
FIG. 18 is a schematic diagram showing a state in which light is diffracted only in a horizontal direction by the one-dimensional diffraction grating type DOE.

By optimizing a duty ratio between the convex and concave portions, it is possible to realize light diffraction characteristics in which diffracted light efficiency is substantially uniform at a wavelength band of a used light (wavelength band of visible light). As schematically shown in FIG. 18, light can be diffracted only in a horizontal direction (width direction of the optical waveguide 82).

For example, as shown in FIG. 17B, values of d, p and f are set to satisfy f=0.5 to 0.7 and p/d=1.5 to 2.5 in which d is the height of the convex portion, p is the pitch thereof, and f·p is the width thereof.

Figure 19A:
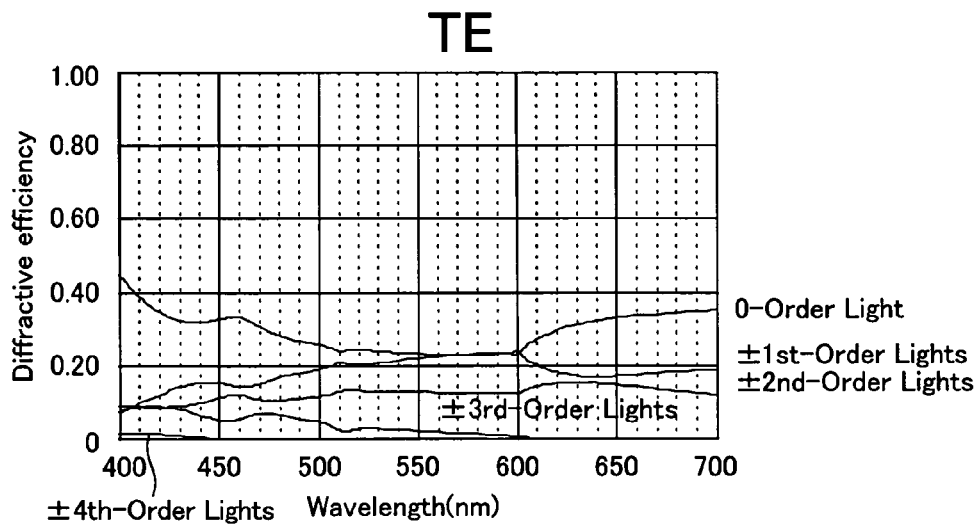
FIG. 19A is a diagram showing a relation between wavelengths of a 0-order light, ±1st-order lights, ±2nd-order lights, ±3rd-order lights and ±4th-order lights of TE waves and diffractive efficiency.
Figure 19B:
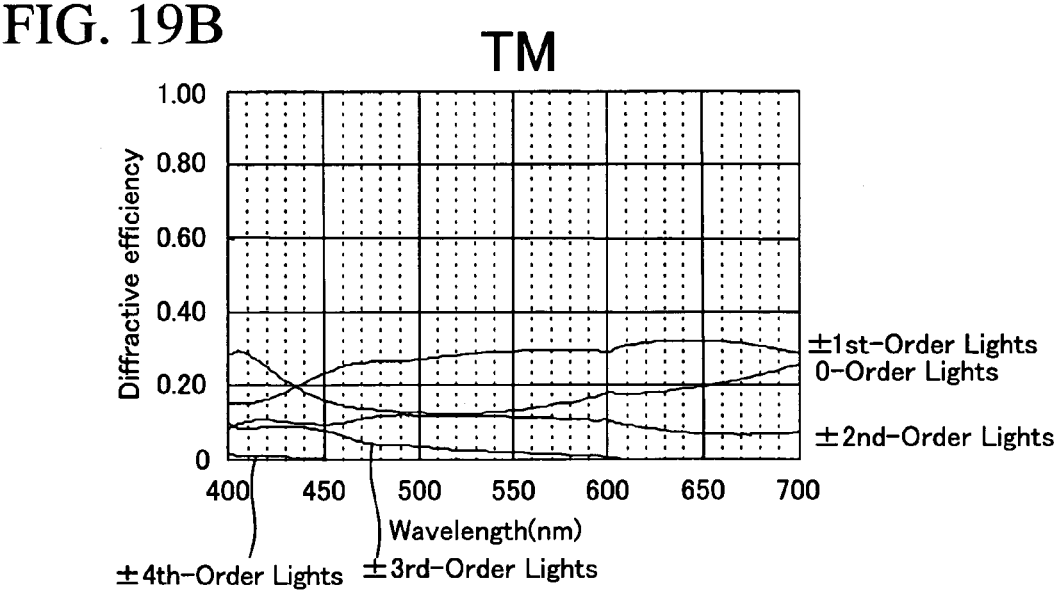
FIG. 19B is a diagram showing a relation between wavelengths of a 0-order light, ±1st-order lights, ±2nd-order lights, ±3rd-order lights and ±4th-order lights of TM waves and diffractive efficiency.

FIG. 19A is a diagram showing a relation between wavelengths of a 0-order light, ±1st-order lights, ±2nd-order lights, ±3rd-order lights and ±4th-order lights and diffractive efficiency of transverse electric waves (TE waves), in which the wavelengths are indicated by the abscissa and the diffractive efficiency is indicated by the ordinate. FIG. 19B is a diagram showing a relation between wavelengths of a 0-order light, ±1st-order lights, ±2nd-order lights, ±3rd-order lights and ±4th-order lights and diffractive efficiency of transverse magnetic waves (TM waves), in which the wavelengths are indicated by the abscissa and the diffractive efficiency is indicated by the ordinate. As shown in FIGS. 19A and 19B, substantially equal values of diffractive efficiency are realized in the used wavelength bands.

The embodiment provides an effect that uneven brightness of the lighting device can be prevented and a good quality image can be displayed in the liquid crystal display device. According to the embodiment, since the DOE 82a is constituted of a binary concave and convex pattern, mold manufacturing is easy, and uniform and high quality lighting device can be mass produced. Moreover, the present invention provides an advantage of high light usage efficiency because light is diffused in a width direction of the optical waveguide 82 and leakage light is prevented.

Fourth Embodiment

In the first to third embodiments, diffusion optical elements (DOEs) are injection-molded out of resin such as polymethyl methacrylate (PMMA). In this case, the boundary surfaces between the concave and convex portions are preferably formed perpendicular to the end surface of the optical waveguide. To that end, however, stringent conditions are required for the molding; the mold temperature should be set high enough to increase the fluidity of resin, or the pressure at which resin is injected should be set high. These stringent conditions may lead to a decreased yield. Meanwhile, resin may be gradually injected into the mold. However, this leads to low throughput and triggers an increase in the production cost.

Figure 20A:
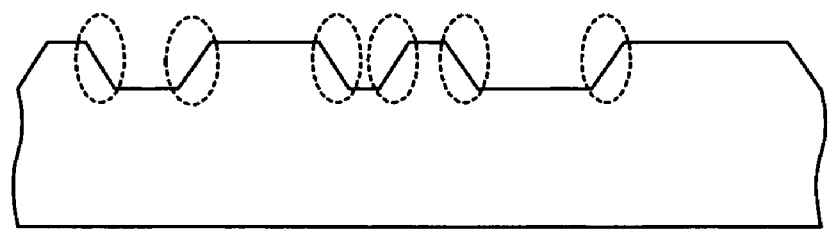
FIG. 20A is a cross-sectional view showing an optical waveguide of a lighting device according to a fourth embodiment of the present invention, which is used for liquid crystal display devices.
Figure 20B:
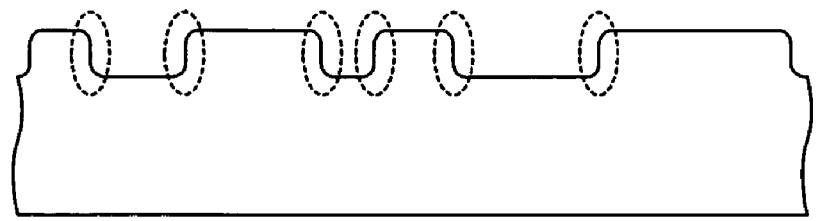
FIG. 20B is a cross-sectional view showing an optical waveguide of a lighting device according to a fourth embodiment of the present invention, which is used for liquid crystal display devices.

These problems can be solved in the following configurations as shown in FIGS. 20A and 20B: the boundary surfaces between the concave and convex portions (encircled by broken lines in the drawings) are inclined; or the portion near the top or near the bottom of the boundary surfaces is rendered curved. In this way, it is conceivable that desired DOE characteristics cannot be obtained when the boundary surfaces are not perpendicular to the end surface of the optical waveguide. However, studies conducted by the present inventors have already revealed that the change in the DOE characteristics is negligible unless the angle of inclination of the boundary surface is far away from perpendicularity (90°) or unless a curvature of the curved shape is large. Hereinafter, these findings will be described in detail.

Figure 21A:
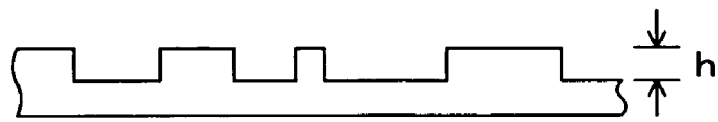
FIG. 21A is a schematic view showing the cross-section of a DOE, where the boundary surfaces between the concave and convex portions are perpendicular to the end surface of the optical waveguide.
Figure 21B:
FIG. 21B shows the simulation result of diffusion characteristics of the same DOE.
Figure 21C:
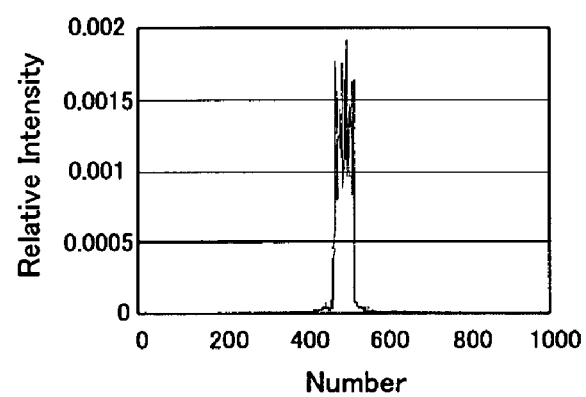
FIG. 21C shows the distribution of intensity of the diffusion characteristics of the same DOE, measured along the A—A line in FIG. 21B.
Figure 22A:
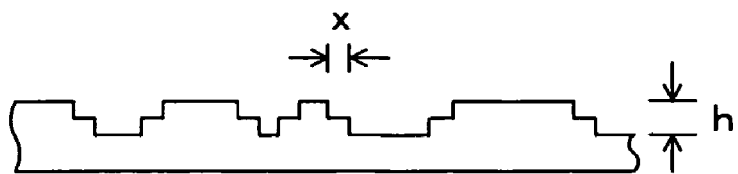
FIG. 22A is a schematic view showing the cross-section of a DOE that has steps on its boundary surfaces.
Figure 22B:
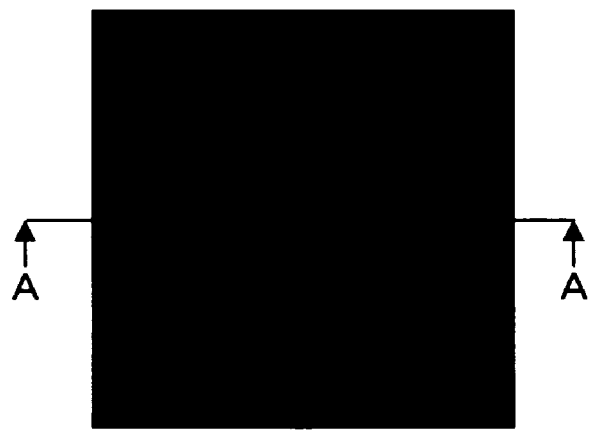
FIG. 22B shows the simulation result of diffusion characteristics of the same DOE.
Figure 22C:
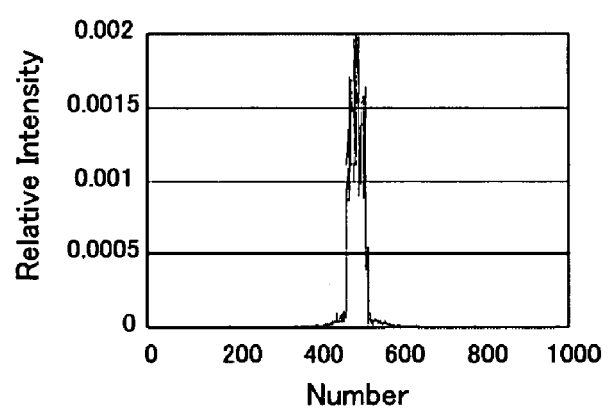
FIG. 22C shows the distribution of intensity of the diffusion characteristics of the same DOE, measured along the A—A line in FIG. 22B.

FIG. 21A is a schematic view showing the cross-section of a DOE, where the boundary surfaces between the concave and convex portions are perpendicular to the end surface of the optical waveguide. FIG. 21B shows the simulation result of diffusion characteristics of the same DOE. FIG. 21C shows the distribution of intensity of the diffusion characteristics of the same DOE, measured along the A—A line in FIG. 21B. FIG. 22A is a schematic view showing the cross-section of a DOE that has steps on its boundary surfaces. FIG. 22B shows the simulation result of diffusion characteristics of the same DOE. FIG. 22C shows the distribution of intensity of the diffusion characteristics of the same DOE, measured along the A—A line in FIG. 22B. Herein, the depth of the concave (the height of the convex d) is set to h, the step height h/2, and the step width x half the pitch p of the convex (i.e. p/2).

Figure 23A:
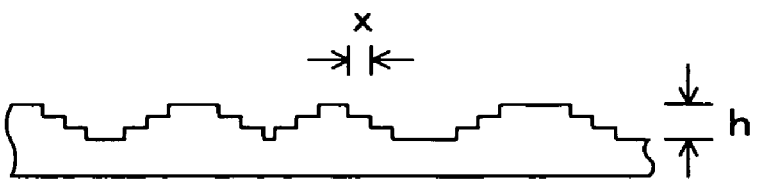
FIG. 23A is a schematic view showing the cross-section of a DOE that has 4 steps on the boundary surfaces between the concave and convex portions.
Figure 23B:
FIG. 23B shows the simulation result of diffusion characteristics of the same DOE.
Figure 23C:
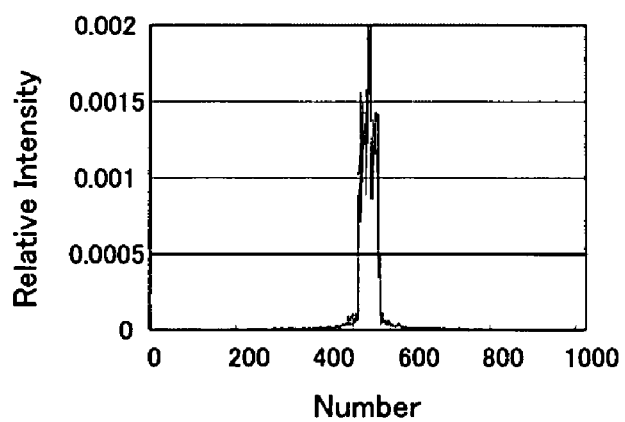
FIG. 23C shows the distribution of intensity of the diffusion characteristics of the same DOE, measured along the A—A line in FIG. 23B.

Furthermore, FIG. 23A is a schematic view showing the cross-section of a DOE that has 4 steps on the boundary surfaces between the concave and convex portions. FIG. 23B shows the simulation result of diffusion characteristics of the same DOE. FIG. 23C shows the distribution of intensity of the diffusion characteristics of the same DOE, measured along the A—A line in FIG. 23B. Herein, the depth of the concave is set to h, the step height h/3, and the step width x half the pitch p of the convex (i.e. p/2).

As can be seen from FIGS. 21A, 21B, 21C, 22A, 22B, 22C, 23A, 23B and 23C, DOEs that have steps on their boundary surfaces between the concave and convex portions exhibit slightly low diffusion intensities and 0-order transmitted lights are slightly increased, causing little change in the diffusion distributions. When infinitely many steps are provided, the boundary surfaces between the concave and convex portions become smooth slopes as shown in FIG. 20A. When the number of steps is infinite in FIG. 22A, the inclination angle, measured counterclockwise from the flat bottom of the concave, equals to 41.35°. When the number of steps is infinite in FIG. 23A, the inclination angle, measured counterclockwise from the flat bottom of the concave, equals to 30.40°. These simulations revealed that if the inclination angle is within 30 to 90°, there is little difference in DOE characteristics between a DOE with boundary surfaces that are perpendicular to an end of the optical waveguide and a DOE with inclined boundary surfaces, as shown in FIG. 20A.

Figure 24:
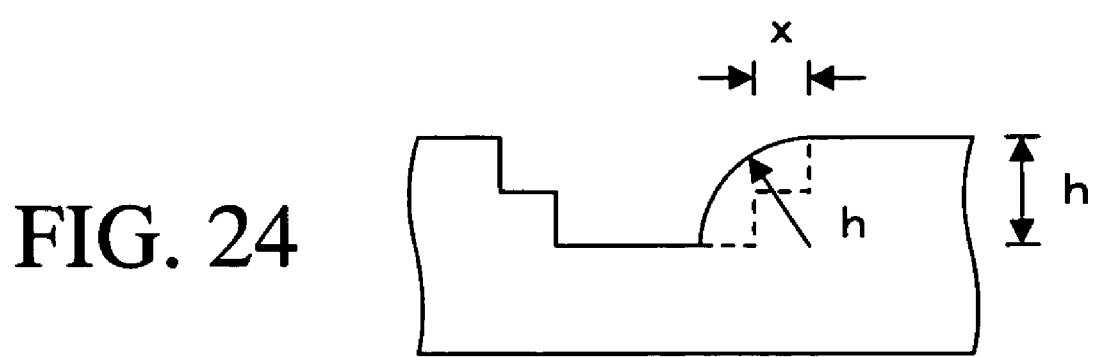
FIG. 24 is a schematic view showing the overlaid cross-sections of DOEs; one that has a curved boundary surface, and one that has a step on its boundary surface.

Meanwhile, the shape shown in FIG. 22A creates a more stringent condition than the curved boundary surface as shown in FIG. 24 that has an h (the depth of the concave)-radius curve for excellent diffusion characteristics. To be more specific, even when the boundary surfaces between the concave and convex portions have an h-radius curve as shown in FIG. 24, the change in the diffusion characteristics is smaller than the change in the diffusion characteristics of DOEs shown in FIGS. 22B and 22C. Thus, there is no practical problem. In addition, the boundary surfaces as shown in FIG. 20B where the portions near the top and bottom are rendered curved have a smaller radius than the boundary surfaces shown in FIG. 24. For this reason, the change in the diffusion characteristics is smaller and, likewise, there is no practical problem.

Formation of a mold with slopes or curved surfaces that are tailored to the boundary surfaces of individual DOEs can be considered as a way to form DOEs that have boundary surfaces as shown in FIGS. 20A and 20B. However, the present inventors revealed that, even when a mold is used in which surfaces corresponding to the boundary surfaces of a DOE are vertically aligned, the boundary surfaces as shown in FIGS. 20A and 20B can be formed by, for example, setting the mold temperature at which resin is injected in it lower than the mold temperature at which the boundary surfaces as shown in FIG. 21A is formed.

Fifth Embodiment

Figure 25:
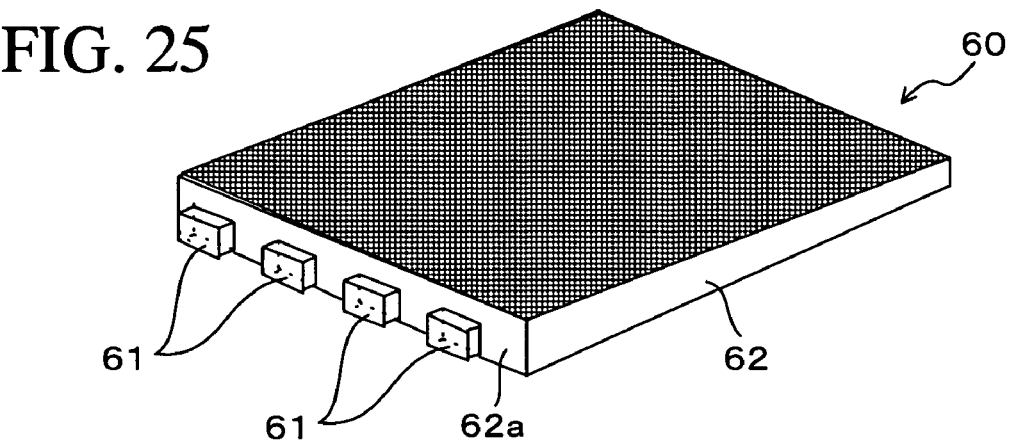
FIG. 25 is a perspective view showing a lighting device according to a fifth embodiment of the present invention.

FIG. 25 is a perspective view showing a lighting device according to a fifth embodiment of the present invention. This embodiment differs from the first embodiment in that, by a blast processing, fine convex and concave (shaded area in the drawing) are formed on the entire light emitting surface of the optical waveguide 62, and other configurations are basically similar to those of the first embodiment. Accordingly, in FIG. 25 the same components as those shown in FIG. 5 are designated using the same numerals and symbols, and hence a detailed description thereof will be omitted.

In this embodiment, a DOE62a is formed on the entire end surface of the optical waveguide 62 around which the LEDs 61 are arranged, and fine concave and convex, formed by a blast processing, are provided on the entire light emitting surface (the surface facing the liquid crystal panel). These concave and convex can be used to adjust the amount of light traveling toward the liquid crystal panel. For example, the amount of light emitted can be increased by increasing the density of the concave and convex and increasing the concave depth (convex height), thereby causing the light to be spread widely. Conversely, the amount of light emitted can be reduced by reducing the density of the concave and convex and reducing the concave depth (convex height) and thereby the light cannot be spread widely. Thus, by adjusting the density of the concave and convex or the convex depth according to segment of the DOE, the distribution of light can be freely adjusted; the liquid crystal panel can be uniformly irradiated with light, the brightness is increased only on the center of the liquid crystal panel.

This embodiment can bring about the following effect in addition to an effect similar to that of the first embodiment. That is, the entire liquid crystal panel can be further uniformly irradiated with light and the distribution of light irradiated to the liquid crystal panel can be adjusted.

Sixth Embodiment

Figure 26:
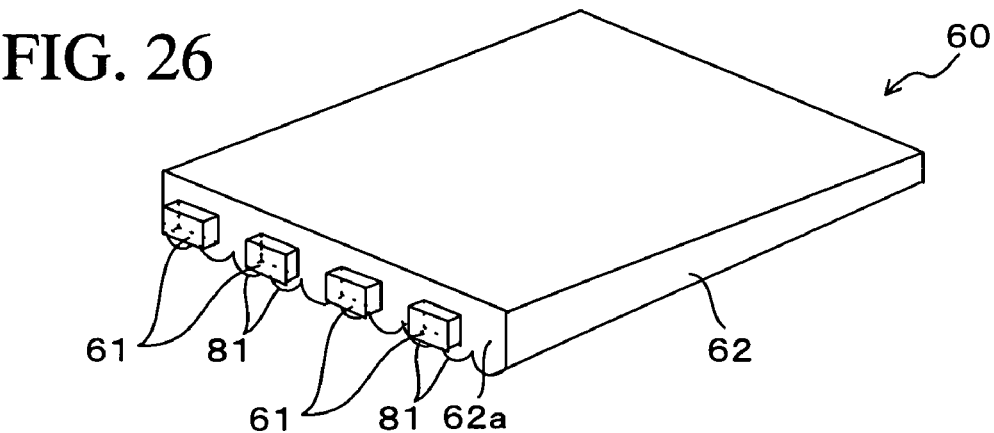
FIG. 26 is a perspective view showing a lighting device according to a sixth embodiment of the present invention.
Figure 27:
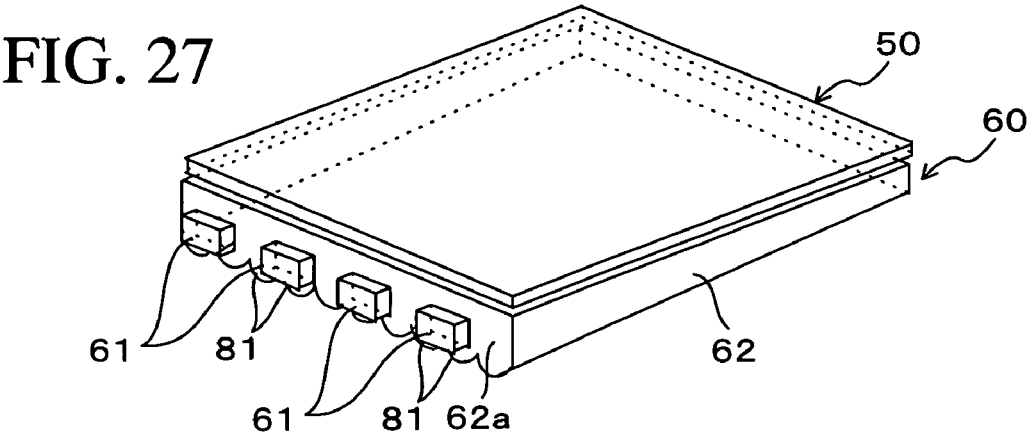
FIG. 27 is a perspective view showing a liquid crystal display device using the lighting device according to the sixth embodiment of the present invention.

FIG. 26 is a perspective view showing a lighting device according to a sixth embodiment of the present invention. FIG. 27 is a perspective view showing a liquid crystal display device using the lighting device according to the sixth embodiment of the present invention. This embodiment differs from the first embodiment in that a plurality of cylindrical lenses 81 are formed on the backside of the optical waveguide 62 (opposite side of the surface facing the liquid crystal panel 50) and other configurations are basically similar to those of the first embodiment. Accordingly, in FIGS. 26 and 27 the same components as those shown in FIG. 5 are designated using the same numerals and symbols, and hence a detailed description thereof will be omitted.

In this embodiment, the DOE62a is formed on the entire end surface of the optical waveguide 62 around which the LEDs 61 are arranged, and the plurality of cylindrical lenses 81 are formed on the backside of the optical waveguide 62 (opposite side of the surface facing the liquid crystal panel 50). These cylindrical lenses 81 are arranged in such a way that the axial directions thereof are along the longitudinal direction of the optical waveguide 62 (direction that is perpendicular to the end surface of the optical waveguide 62 around which the LEDs61 are provided). The cylindrical lenses 81 may have a spherical surface or an aspherical surface.

This embodiment can bring about an effect that when the light emitted from the LEDs 61 propagates through the optical waveguide 62 while being reflected, the light is diffused by the cylindrical lenses 81 and thereby the light uniformity is further improved. The light uniformity can be further improved by forming fine convex and concave on the entire light emitting surface of the optical waveguide of this embodiment, as in the case of the fifth embodiment.

The embodiment has been described by way of the case where the lighting device of the present invention is arranged on the backside of the liquid crystal panel and used as backlight. However, the present invention may be applied to a front light arranged on the front side of the liquid crystal panel.

The embodiment has been described by way of the case where the DOE is formed integrally with the optical waveguide. However, the DOE and the optical waveguide may be individually manufactured, and the DOE may be arranged in the end surface of the optical waveguide.

Furthermore, the embodiment has been described by way of the case where the DOE is constituted of the binary concave and convex pattern. However, the DOE may be constituted of 3-value or 4-value concave and convex pattern (concave and convex pattern of uniform step heights).

What is claimed is:

1. A lighting device comprising:
   a light source;
   an optical waveguide for inputting light emitted from the light source to the inside from an end surface and outputting the light in a predetermined direction; and
   a diffractive optical element arranged in the end surface of the optical waveguide on the light source side, wherein the diffractive optical element is constituted of a concave and convex pattern disposed in the end surface of the optical waveguide, and step heights of the concave and convex pattern are uniform.

2. A lighting device according to claim 1, wherein the concave and convex pattern is formed in the entire end surface on the light source side.

3. A lighting device according to claim 1, wherein the concave and convex pattern is formed only in portions near the light source.

4. A lighting device according to claim 1, wherein concaves and convexes of the concave and convex pattern are two-dimensionally distributed in the end surface of the optical waveguide on the light source side.

5. A lighting device according to claim 1, wherein the diffractive optical element is constituted of a one-dimensional diffraction grating for generating high-order diffracted light.

6. A lighting device according to claim 1, wherein an area ratio of the convex portion of the concave and convex pattern is 30 to 70%.

7. A lighting device according to claim 1, wherein the concave and convex pattern is determined by sampling concaves and convexes of existing members having light scattering surfaces.

8. A lighting device according to claim 1, wherein the diffractive optical element is formed by using a mold having a concave and convex pattern formed by a photoresist method and a plating method.

9. A lighting device according to claim 1, wherein the diffractive optical element generates a point-symmetrical diffused light.

10. A lighting device according to claim 1, wherein the diffractive optical element generates light having diffusion characteristics in which diffusion in a long side direction of the end surface of the optical waveguide on the light source side is larger compared with diffusion in a short side direction thereof.

11. A lighting device according to claim 1, wherein the light source is a light emitting diode.

12. A lighting device according to claim 1, wherein a light distribution control plate is disposed on a light emission surface side of the optical waveguide.

13. A lighting device according to claim 1, wherein the angle which the boundary surfaces between the concave and convex portions in the concave and convex pattern form with an end surface of the optical waveguide is within 30 to 90°.

14. A lighting device according to claim 1, wherein the bottom and sides of the concave are connected by a curved surface.

15. A lighting device according to claim 1, wherein the top and sides of the convex are connected by a curved surface.

16. A lighting device according to claim 1, wherein the bottom and sides of the concave are connected by a curved surface, and the top and sides of the convex are connected by a curved surface.

17. A lighting device according to claim 1, wherein a light emitting surface of the optical waveguide has been subjected to a blast processing.

18. A lighting device according to claim 1, wherein a plurality of lenses for scattering light passing through the optical waveguide is provided on the opposite side of the light emitting surface of the optical waveguide.

19. A lighting device according to claim 18, wherein the lenses are cylindrical lenses.

20. A lighting device according to claim 19, wherein the cylindrical lenses are arranged in such a way that the axial directions thereof are along the longitudinal direction of the optical waveguide (direction that is perpendicular to an end surface of the optical waveguide around which light sources are provided).

21. A lighting device according to claim 20, wherein the cylindrical lenses have an aspherical surface.

22. A liquid crystal display device comprising:
    a liquid crystal panel constituted by sealing a liquid crystal between two substrates; and
    a lighting device for irradiating the liquid crystal panel with light,
    wherein the lighting device includes a light source, an optical waveguide for inputting light emitted from the light source to the inside from an end surface and outputting the light toward the liquid crystal panel, and a diffractive optical element arranged in the end surface of the optical waveguide on the light source side, wherein the diffractive optical element is constituted of a concave and convex pattern disposed in the end surface of the optical waveguide, and step heights of the concave and convex pattern are uniform.

23. A liquid crystal display device according to claim 22, wherein the angle which the boundary surfaces between the concave and convex portions in the concave and convex pattern form with an end surface of the optical waveguide is within 30 to 90°.

* * * * *